Oct. 9, 1928.
C. S. HALL
1,687,204
GAS STORAGE SYSTEM FOR AIRCRAFT
Filed Feb. 2, 1926
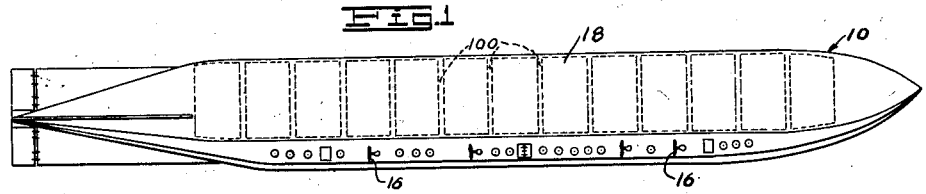
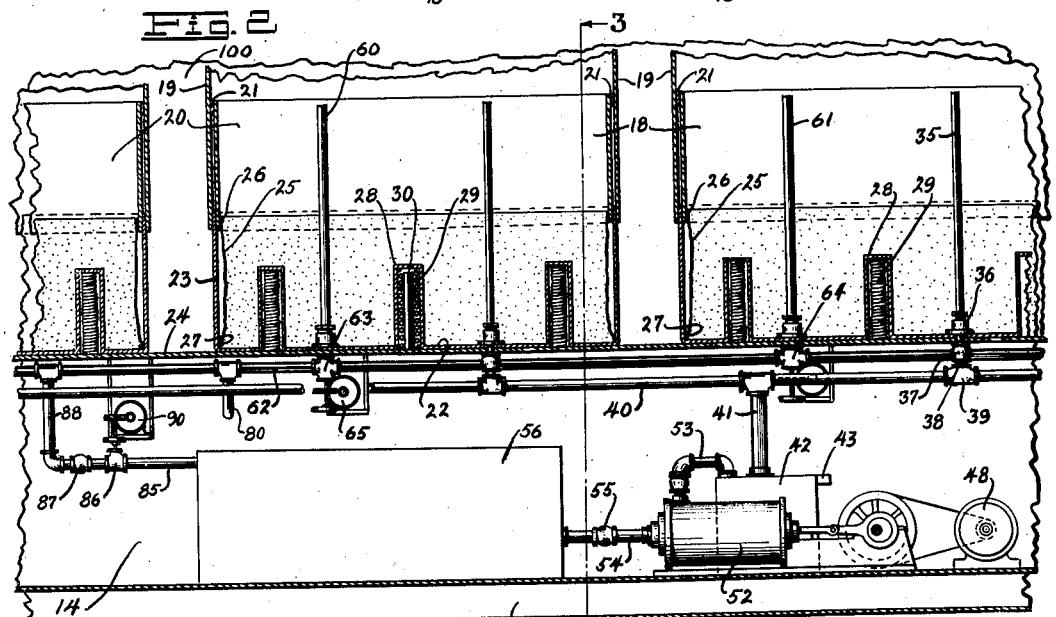
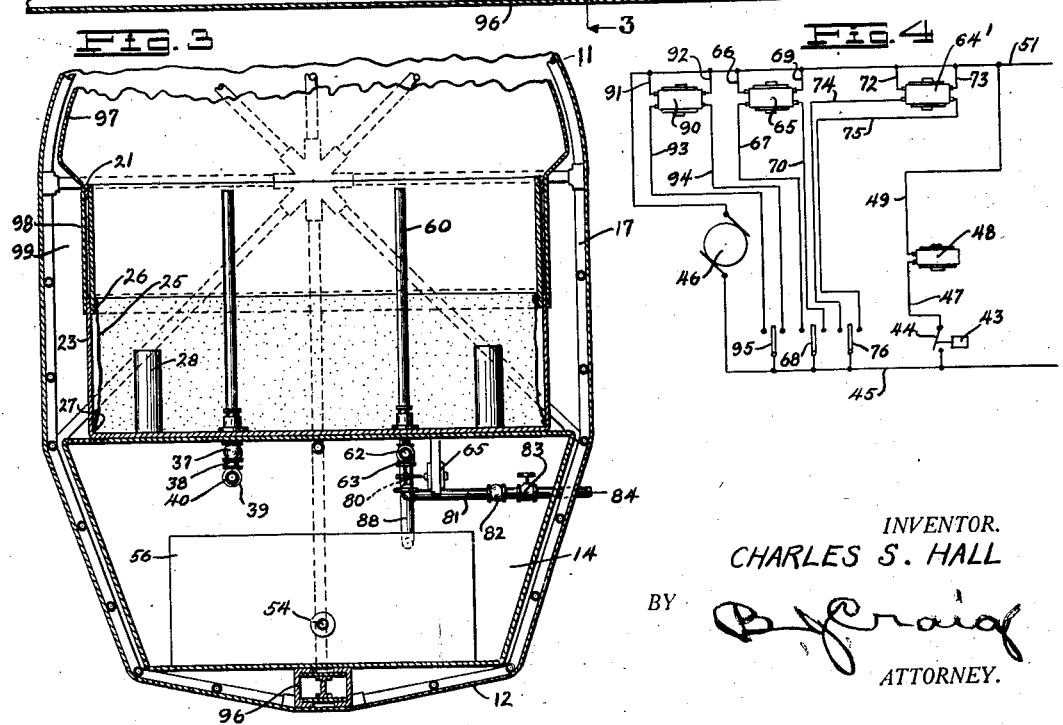
INVENTOR.
CHARLES S. HALL
BY
ATTORNEY.

Patented Oct. 9, 1928.

1,687,204

UNITED STATES PATENT OFFICE.

CHARLES S. HALL, OF OAKLAND, CALIFORNIA.

GAS-STORAGE SYSTEM FOR AIRCRAFT.

Application filed February 2, 1926. Serial No. 85,430.

This invention relates to aircraft.

The general object of the invention is to provide a storage system for the lifting gas of an aircraft whereby the gas will be under the complete control of the operator of the aircraft.

A specific object of the invention is to provide an aircraft including a plurality of compartments wherein the compartments are provided with means for supplying gas thereto, and with means for allowing excess gas to be discharged therefrom.

Another object of the invention is to provide an aircraft having compartments therein with means for changing the capacity of the compartments and wherein means is provided for taking care of the change in volume of the gas incident to the change in size of the compartments.

Another object of the invention is to provide an aircraft having a gas compartment which is provided with novel means for changing the volume of the compartment.

A further object of the invention is to provide an improved gas controlling system for use in lighter-than-air aircraft.

Other objects of the invention will be apparent from the following description taken in connection with the accompanying drawings wherein:

Fig. 1 is a side elevation of an aircraft embodying the features of my invention;

Fig. 2 is a fragmentary central longitudinal view through an aircraft embodying the features of my invention;

Fig. 3 is a section on line 3—3, Fig. 2, and

Fig. 4 is a wiring diagram.

Referring to the drawing by reference characters, I have shown an aircraft embodying the features of my invention generally at 10. This aircraft is preferably of the rigid or semi-rigid type. It may be provided with a rounded top surface 11 and a more or less flat bottom portion 12. Intermediate the length of the aircraft, I arrange a compartment 14 within which the operating and propelling machinery may be housed. The aircraft may be driven by propellers 16 which may be arranged in pairs on the opposite sides of the aircraft.

The aircraft is provided with frame members 17, and these frame members are arranged about gas holding compartments 18. These gas holding compartments 18 are preferably of the rigid type and as many of these compartments may be employed as is found necessary or desirable.

The lifting gas holding compartments 18 each preferably comprise an upper member 19 which may be made of suitable light weight metal or composition. This member 19 is preferably rigid with the frame of the aircraft and may be secured to the upper framework.

Within the lower part of the compartment 18, I arrange a strip 20 which is fastened at 21 adjacent at its upper end to the inner wall of the member 19. This strip is spaced from the adjacent wall of the compartment 18 to provide a narrow recess for a sliding closure member 22. This sliding closure member 22 includes a part 23 which fits within the recess. The closure is adapted in one position to rest upon a base 24 arranged within the aircraft.

A flexible impervious strip 25 has one edge secured at 26 to the strip 20 and the other edge secured at 27 to the closure 22. This construction enables the closure to move up and down relative to upper part without loss of gas.

In order to normally urge the closure member or diaphragm 22 to contracted position I provide this closure member with a plurality of inverted cup-shaped members 28 which receive therein compression springs 29. These springs 29 normally push upwardly and normally serve to hold the closure 22 in a position so that the capacity of the compartment 18 is at a minimum. Suitable posts 30 may be provided for holding the springs 29 in proper position.

From the foregoing description it will be apparent that as the pressure of the gas within the compartment 18 increases the pressure will cause the closure 22 to move downwardly against the tension of the springs 29 to thus increase the volume of the compartments 18.

In order to allow escape of the gas after a certain pressure is reached in the compartments, I provide a pipe 35 in each compartment. This pipe has a packing member 36 thereon. This packing member slides along the pipe and is secured to the bottom of each compartment. The pipes 35 also pass through the base 24 to a relief valve 37 which may be adjusted to different pressures. From the relief valve 37 a pipe 38 extends to a fitting 39.

Each of the fittings 39 is connected to a pipe line 40 from which a pipe 41 extends to a relief storage receptacle 42.

This tank 42 is provided with a pressure controlled member 43 so that when the contents of the tank 42 reach a predetermined pressure the member 43 will operate to move a switch 44 and thereby place a lead 45 from a generator 46 in circuit with one terminal of a motor 48. The other terminal of the motor 48 is in circuit with a lead 49 which is in turn connected to a lead 51 connected to the other side of the generator.

Operation of the motor 48 will cause operation of a pump 52 to which the tank 42 is connected by a pipe 53. When the motor is operating the pump 52 will draw gas from the tank 42 and will force it through a pipe 54 and check valve 55 into a high pressure storage tank 56. If desired a gas cooling device may be associated with the check valve 55 so that gas passing into the high pressure gas tank 56 will be cooled.

In order to fill the compartments 18 with gas supplied from an external source, I provide filling pipes 60 and 61 for the compartments. Each of these pipes is connected to a supply pipe 62 shown as extending longitudinally of the aircraft. Communication between the pipe 62 and the pipes 60 and 61 is controlled by means of valves 63 and 64 respectively so that one compartment can be filled without filling the other compartments.

The valve 63 is controlled by a reversible motor 65 which has one terminal 66 connected to the lead 51 and has another terminal connected to a lead 67 which is connected to a switch 68 in circuit with the lead 45. The other terminals of the motor are connected by leads 69 and 70 with the lead 51, and the switch 68 respectively so that by operating the switch 68 the motor may be turned in either direction to open or close the valve 63.

In a similar manner a motor 64' controls the valve 64. This motor is connected by leads 72 and 73 with the lead 51 and by leads 74 and 75 with a reversing switch 76. This switch 76 is in circuit with the lead 45 so that by operating the switch 76 the valve 64 will be controlled.

The pipe 62 is connected to a pipe 80 which is connected to a pipe 81 having thereon a check valve 82 and a control valve 83. The end of the pipe 81 projects beyond the side of the aircraft so that a filling line may be secured thereto.

In order that the compressed gas contained in the tank 56 may be available for inflating the compartments 18, I connect a pipe 85 to this tank 56. This pipe 85 has a control valve 86 thereon and an expansion valve 87. The pipe 85 is also connected by a pipe 88 with the supply pipe 62.

The valve 86 is adapted to be controlled by a motor 90 which is connected by a lead 91 and 92 with the lead 51 and by leads 93 and 94 with a reversing switch 95 which is connected to the lead 45.

It will thus be apparent that by operating the switch 95 the flow of gas from the tank 56 to the pipe 62 may be controlled.

In order to provide rigidity for the aircraft, I may arrange a keel 96 along the bottom portion thereof. This keel extends beneath the portions containing the operating machinery, and extends to the ends of the aircraft.

In order to utilize all the possible space for storage of lifting gases while at the same time making provision for ready access to the operating parts, I conform the upper portion of the gas holding compartments 97 to the shape of the upper portion of the aircraft. The lower portion of the compartments 98 is of reduced width to provide a passageway 99 to thus enable inspection and repair of the operating parts to be readily made. I also provide a narrow transverse space 100 between each compartment for the same purpose.

From the foregoing description it will be apparent that I have provided an improved aircraft and also a gas storage system for aircraft which is practical, highly efficient in operation and not likely to get out of order.

Having thus described my invention, I claim:

1. An aircraft having a rigid gas holding compartment therein, said compartment including a movable wall, a relief tank, a pipe connecting said compartment and said relief tank, a high pressure gas storage tank and means to withdraw gas from said relief tank and force it into high pressure tank when the pressure in said relief tank reaches a certain amount.

2. In an aircraft, an elongated body having a gas holding compartment therein, said gas holding compartment including two members, one of said members being fixed with respect to the body of said aircraft and the other member being movable with respect to the fixed member, both of said members being rigid.

3. An aircraft having a gas holding compartment therein, said gas holding compartment comprising two members, one of said members being an open ended body, said body having a strip thereon spaced from one end thereof to provide a recess, said other member comprising an inverted cup-shaped member having a flange fitted within said recess and means to limit the movement of said last mentioned member in one direction.

4. In an aircraft, a gas holding compartment, a relief pipe in said gas holding compartment, a relief tank, a pipe connecting said relief pipe and said relief tank, a relief valve in said pipe normally preventing passage of gas from the compartment to the tank but permitting passage when a certain pressure is reached, a high pressure gas storage tank and automatic means to withdraw gas from said relief tank and force it into high pressure tank when the pressure in said relief tank reaches a certain point.

5. An aircraft having a gas holding compartment therein, said gas holding compartment comprising two members, one of said members being an open ended body, said other member comprising an inverted cup-shaped member having a flange coacting with said body, and resilient means normally urging said cup-shaped member to a position to reduce the capacity of the compartment.

6. In an aircraft, a gas holding compartment comprising two members, one of said members being an open ended body, said body having a strip thereon spaced from one end thereof to provide a recess, said other member comprising a closure having a flange fitted within said recess, a base on said aircraft, a receptacle on said closure, a spring within said receptacle, and normally urging said closure to a position to reduce the capacity of the compartment, and a flexible member having one edge connected to one edge of said first member, and having another edge connected to said closure.

7. An aircraft having a gas holding compartment therein, a relief tank, a pipe connecting said compartment and said relief tank, a relief valve in said pipe normally preventing passage of gas from the compartment to the tank but permitting passage when a certain pressure is reached, a high pressure gas storage tank and means to withdraw gas from said relief tank and force it into high pressure tank, said means comprising a pump, a motor for operating said pump, a source of power and a pressure operated switch for placing said source of power in circuit with said motor when the pressure in said tank reaches a certain amount.

8. In an aircraft having a rounded upper surface, a gas holding compartment therein, said gas holding compartment including an upper rigid portion arranged in close proximity to the outer covering of said aircraft and having lower rigid side walls, portions of which are spaced from the side wall covering of the aircraft.

9. An aircraft having a gas holding compartment therein, a supply pipe extending from said compartment to a position without said aircraft, a valve for said pipe, a relief pipe line on said aircraft, a relief pipe connecting said compartment with said relief pipe line, a relief tank, means connecting said relief tank with said relief pipe line, a high pressure storage tank, means to remove gas from said relief tank and force it into high pressure tank, means to connect said high pressure tank with supply line, said means including a pipe having a control valve therein and having an expansion valve therein, and means to selectively control the movement of the gas.

10. In an aircraft having a rounded upper surface, a gas holding compartment therein, said gas holding compartment including an upper portion having its top arranged in close proximity to the outer covering of said aircraft said upper portion having rigid lower side walls, a portion of said rigid side walls being spaced from the side wall covering the aircraft.

In testimony whereof, I hereunto affix my signature.

CHARLES S. HALL.